United States Patent
Mesecher et al.

(10) Patent No.: US 7,519,395 B2
(45) Date of Patent: *Apr. 14, 2009

(54) ADAPTIVE CANCELLATION OF FIXED INTERFERERS

(75) Inventors: David K. Mesecher, Huntington Station, NY (US); Fatih Ozluturk, Port Washington, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/204,883

(22) Filed: Aug. 16, 2005

(65) Prior Publication Data

US 2005/0277442 A1 Dec. 15, 2005

Related U.S. Application Data

(63) Continuation of application No. 09/888,882, filed on Jun. 25, 2001, now Pat. No. 6,937,879, which is a continuation of application No. 09/038,922, filed on Mar. 12, 1998, now Pat. No. 6,289,004.

(51) Int. Cl.
*H04B 1/38* (2006.01)

(52) U.S. Cl. .................. 455/561; 455/278.1; 455/63.1; 455/269; 370/310; 342/73

(58) Field of Classification Search .............. 455/561, 455/278.1, 562.1, 63.1, 132, 269; 370/286, 370/310, 290; 342/61, 73, 350
See application file for complete search history.

(56) References Cited

U.S. PATENT DOCUMENTS

| | | | |
|---|---|---|---|
| 4,644,359 A | 2/1987 | Katagi et al. | |
| 5,061,943 A | 10/1991 | Rammos | |
| 5,377,183 A | 12/1994 | Dent | |
| 5,493,307 A | 2/1996 | Tsujimoto | |
| 5,630,016 A * | 5/1997 | Swaminathan et al. | 704/228 |
| 5,694,134 A | 12/1997 | Barnes | |
| 5,818,517 A * | 10/1998 | Hudson et al. | 348/21 |
| 5,914,950 A | 6/1999 | Tiedermann et al. | |
| 5,949,370 A * | 9/1999 | Smith et al. | 342/354 |
| 5,974,087 A | 10/1999 | Nowara | |
| 6,121,914 A * | 9/2000 | Cavelos et al. | 342/16 |
| 6,289,004 B1 | 9/2001 | Mesecher et al. | |
| 6,304,750 B1 | 10/2001 | Rashid-Farrokhi et al. | |
| 6,359,923 B1 * | 3/2002 | Agee et al. | 375/130 |
| 6,526,291 B1 * | 2/2003 | Ekstrom et al. | 455/562.1 |
| 6,646,601 B2 * | 11/2003 | Samson et al. | 342/418 |

FOREIGN PATENT DOCUMENTS

| | | |
|---|---|---|
| DE | 3223598 | 5/1991 |
| EP | 0684660 | 11/1995 |

(Continued)

*Primary Examiner*—Nghi H Ly
(74) *Attorney, Agent, or Firm*—Volpe and Koenig, P.C.

(57) ABSTRACT

An improved base station which cancels the effects of known fixed interference sources produces a signal substantially free from the interference sources thereby increasing total channel capacity. The adaptive interference canceller base station includes a main antenna for receiving signals from other communication stations and at least one directional antenna directed toward an interference source. The main and directional antennas are coupled together such that an output signal substantially free from the interference is generated.

11 Claims, 15 Drawing Sheets

FOREIGN PATENT DOCUMENTS

| | | |
|---|---|---|
| JP | S48-8437 | 6/1971 |
| JP | S58-101508 | 6/1983 |
| JP | S58-103205 | 6/1983 |
| JP | S58-164301 | 9/1983 |
| JP | H1-300701 | 12/1989 |
| JP | H7-245519 | 9/1995 |
| JP | 7321535 | 12/1995 |
| JP | H8-335827 | 12/1996 |
| JP | H9-135119 | 5/1997 |
| WO | 97/02714 | 1/1997 |

* cited by examiner

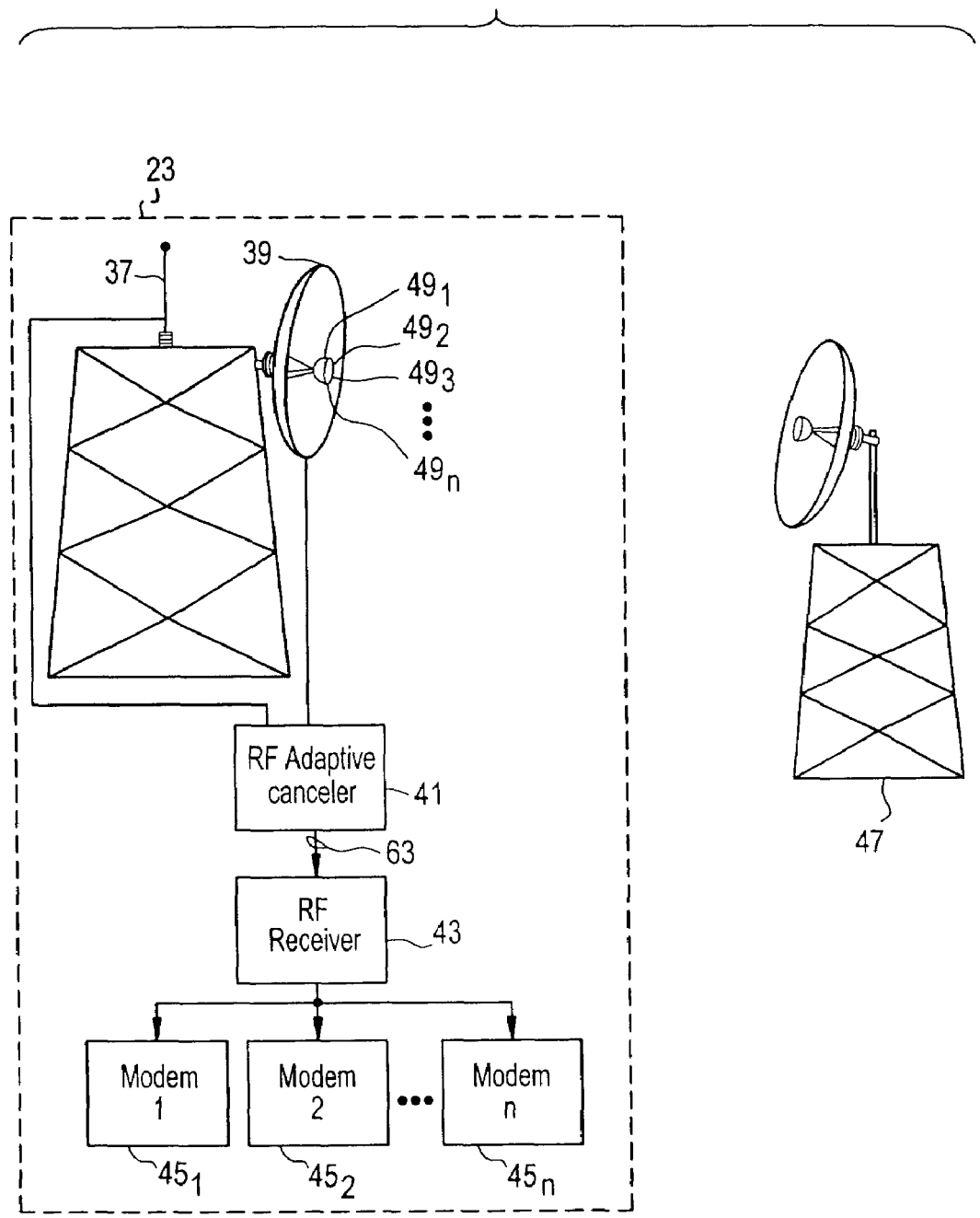

ADAPTIVE CANCELLATION OF FIXED INTERFERERS

CROSS REFERENCE TO RELATED APPLICATIONS

This application is a continuation of application Ser. No. 09/888,882, filed on Jun. 25, 2001, which is a continuation of application Ser. No. 09/038,922, filed on Mar. 12, 1998, now issued as U.S. Pat. No. 6,289,004.

BACKGROUND OF THE INVENTION

1. Field of the Invention

The present invention relates to wireless digital communication systems. More particularly, the present invention relates to an adaptive interference canceler included within telecommunication base stations and uses at least one auxiliary antenna in conjunction with a primary antenna for increasing the capacity of the telecommunication system by substantially reducing interference produced by one or more known interference sources proximate to the base station.

2. Description of the Prior Art

Over the last decade consumers have become accustomed to the convenience of wireless communication systems. This has resulted in a tremendous increase in the demand for wireless telephones, wireless data transmission and wireless access to the Internet. The amount of available RF spectrum for any particular system is often quite limited due to government regulation and spectrum allotments.

CDMA communication systems have shown promise in the effort to provide efficient utilization of the RF spectrum. At least one brand of CDMA systems, Broadband Code Division Multiple Access™ or B-CDMA™ communication systems available from InterDigital Communications Corporation, permit many communications to be transmitted over the same bandwidth, thereby increasing the capacity of the allotted RF spectrum. In B-CDMA™ communication systems, a data signal at the transmitter is mixed with a pseudorandom "spreading code" to spread the information signal across the entire transmission bandwidth or spectrum employed by the communication system. Afterwards, the spread spectrum signal is modulated with an RF carrier signal for transmission. A receiver receives the transmitted RF carrier signal and down converts the signal to a spread baseband signal. The spread data signal is despread by mixing the locally generated pseudorandom spreading code with the spread signal.

In order to detect the information embedded in a received signal, a receiver must use the same pseudorandom spreading code that was used to spread the signal. Signals which are not encoded with the pseudorandom code of the receiver appear as background noise to the receiver. However, signal frequencies within the transmission bandwidth contribute to the overall background noise making it difficult for receivers to properly detect and receive signals. A subscriber may increase the power of his transmitted signal to compensate, but overpowering interferes with the reception of other communication channels sharing the same communication bandwidth.

The allocated transmission bandwidths of many CDMA communication systems approach or share frequencies with other communication systems, such as microwave relaying or cellular communication systems. These systems may present interference signals which can greatly exceed the power of the CDMA communication signals in specific regions of the transmission bandwidth.

Applicants have recognized the need to decrease the amount of interference from identified manmade interferers in order to efficiently increase the allocated spectrum capacity of a CDMA communication system.

SUMMARY OF THE INVENTION

The present invention provides an improved base station which cancels the effects of known fixed interference sources to produce a signal substantially free from the interference sources.

In one embodiment, an antenna system in conjunction with a base station is deployed at a location with one or more known interference sources. The antenna system includes a main antenna for receiving signals from other communication stations and at least one directional antenna directed toward an interference source. The main and directional antennas are coupled to an adaptive canceler, which weights signals received by the directional antennas and sums the weighted signals to produce a cancellation signal. The adaptive canceler subtracts the cancellation signal from the signals received by the main antenna to provide an output signal substantially free from the interference generated by the one or more known interference sources. The adaptive canceller may use a plurality of feedback loops to implement a least mean square (LMS) algorithm to properly weight the directional antenna signals.

Accordingly, it is an object of the present invention to decrease the amount of interference produced from manmade interference sources that is processed as a received CDMA communication signal.

Other advantages may become apparent to those skilled in the art after reading the detailed description of the preferred embodiment.

BRIEF DESCRIPTION OF THE DRAWINGS

FIG. 3A is a diagram of a base station of the present invention.

DESCRIPTION OF THE PREFERRED EMBODIMENTS

Figure 1:
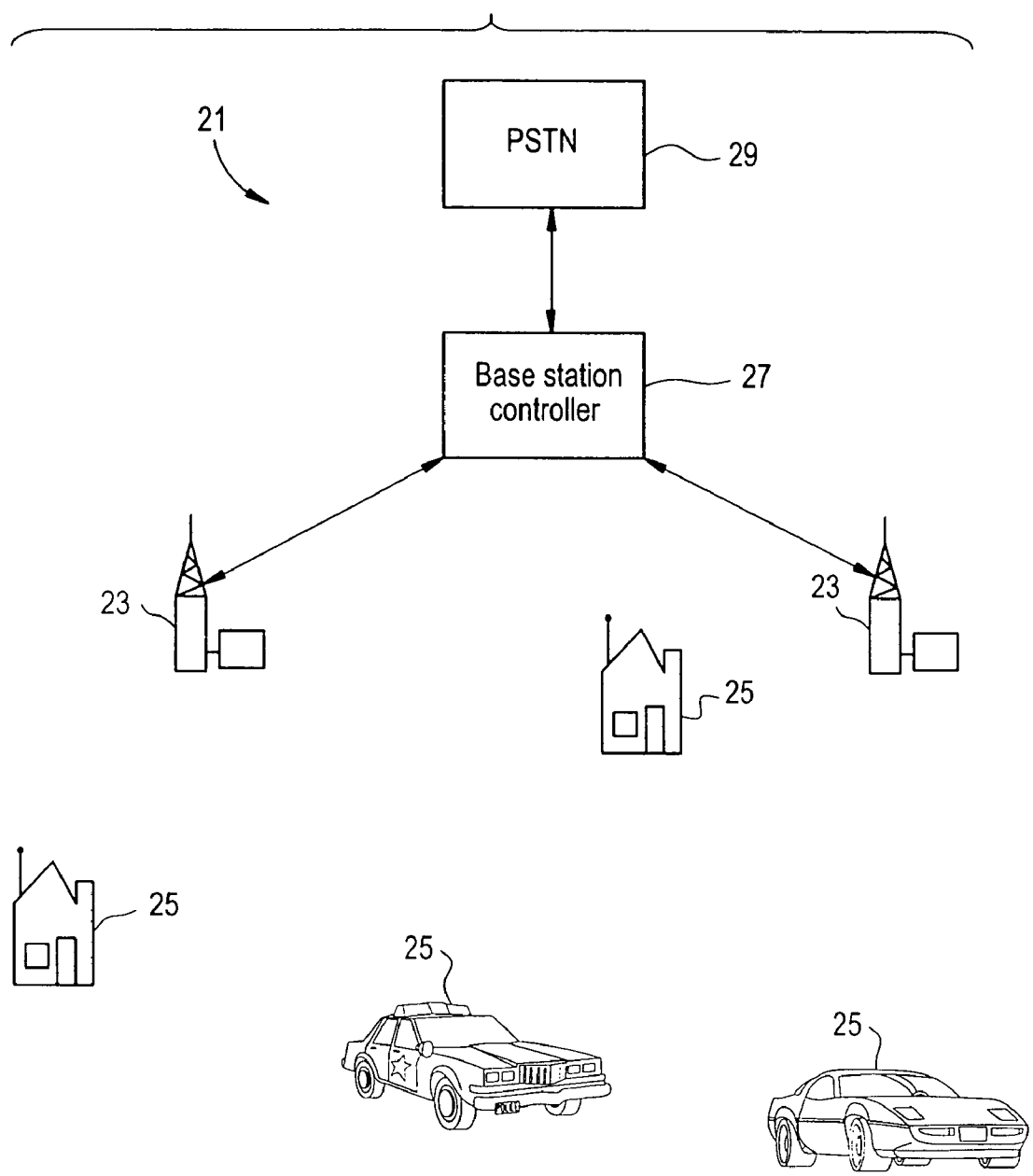
FIG. 1 is a communication network embodiment of the present invention.

Presently preferred embodiments are described below with reference to the drawing figures wherein like numerals represent like elements throughout.

A communication network 21 embodying the present invention is shown in FIG. 1. The communication network 21 generally comprises one or more base stations 23, each of which is in wireless communication with a plurality of subscriber units 25, which may be fixed or mobile. Each subscriber unit 25 communicates with either the closest base station 23 or the base station 23 which provides the strongest communication signal. The base stations 23 also communicate with a base station controller 27, which coordinates communications among base stations 23. The communication network 21 may also be connected to a public switched telephone network (PSTN) 29, wherein the base station controller 27 also coordinates communications between the base stations 23 and the PSTN 29. Preferably, each base station 23 communicates with the base station controller 27 over a wireless link, although a land line may also be provided. A land line is particularly applicable when a base station 23 is in close proximity to the base station controller 27.

The base station controller 27 performs several functions. Primarily, the base station controller 27 provides all of the operations, administrative and maintenance (OA&M) signaling associated with establishing and maintaining all of the wireless communications between the subscriber units 25, the base stations 23, and the base station controller 27. The base station controller 27 also provides an interface between the wireless communication system 21 and the PSTN 29. This interface includes multiplexing and demultiplexing of the communication signals that enter and leave the system 21 via the base station controller 27.

Figure 2:
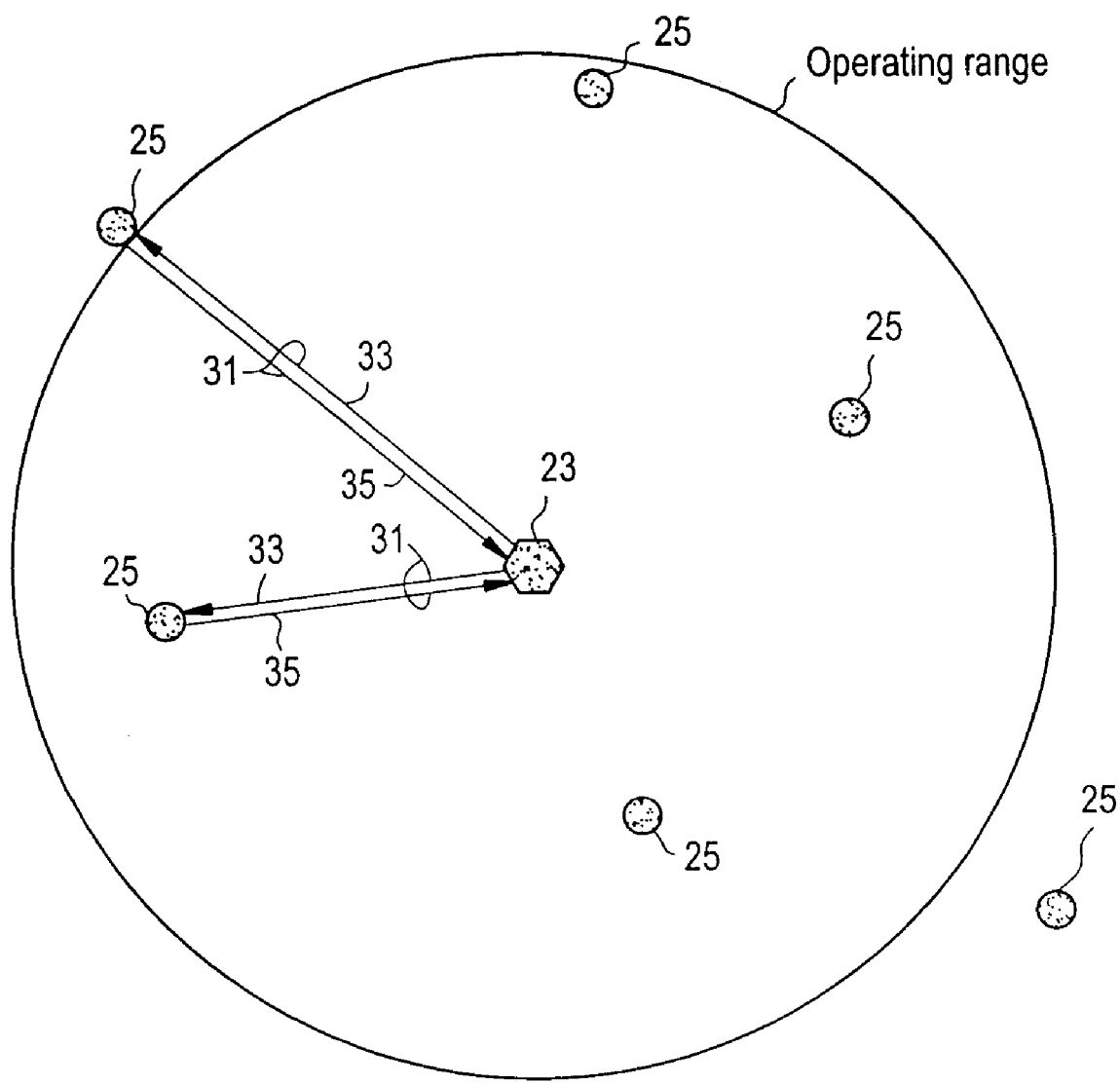
FIG. 2 shows propagation of signals between a base station and a plurality of subscriber units.

Referring to FIG. 2, the propagation of signals between a base station 23 and a plurality of subscriber units 25 is shown. A two-way communication path 31 comprises a forward signal 33 transmitted (TX) from the base station 23 to a subscriber 25 and a return signal received 35 (RX) by the base station 23 from the subscriber 25. The signal between the base station 23 and the subscriber 25 includes the transmission of a global pilot signal. The pilot signal is a RF modulated spreading code with no data modulation. The pilot signal is used for synchronizing the base station 23 with the subscriber 25. A communication channel is established upon synchronization.

Referring to FIG. 3A, a base station 23 of the present invention includes a main antenna 37 and an auxiliary antenna 39 which are coupled to a RF adaptive canceler 41. The output of the adaptive canceler 41 is coupled to a RF receiver 43, which is coupled to a plurality of modems $45_1$-$45_n$. Each CDMA communication channel is spread with a unique spreading code. The plurality of modems $45_1$-$45_n$ enable simultaneous processing of multiple CDMA communications, each processing a communication associated with a different spreading code.

Signals which are not encoded with the proper pseudorandom code appear as background noise or interference to a particular communication. In addition, the level of noise may increase due to a known interferer 47. For example, a local radio station may be an interferer because it broadcasts a signal in the same transmission bandwidth used by the base station 23. To overcome the interference, the subscriber units 25 must increase their transmission power exacerbating the level of background noise since the increase in power by the subscribers 25 increases the level of noise thereby decreasing the number of subscribers 25 which can be accommodated by the base station 23.

Figure 3B:
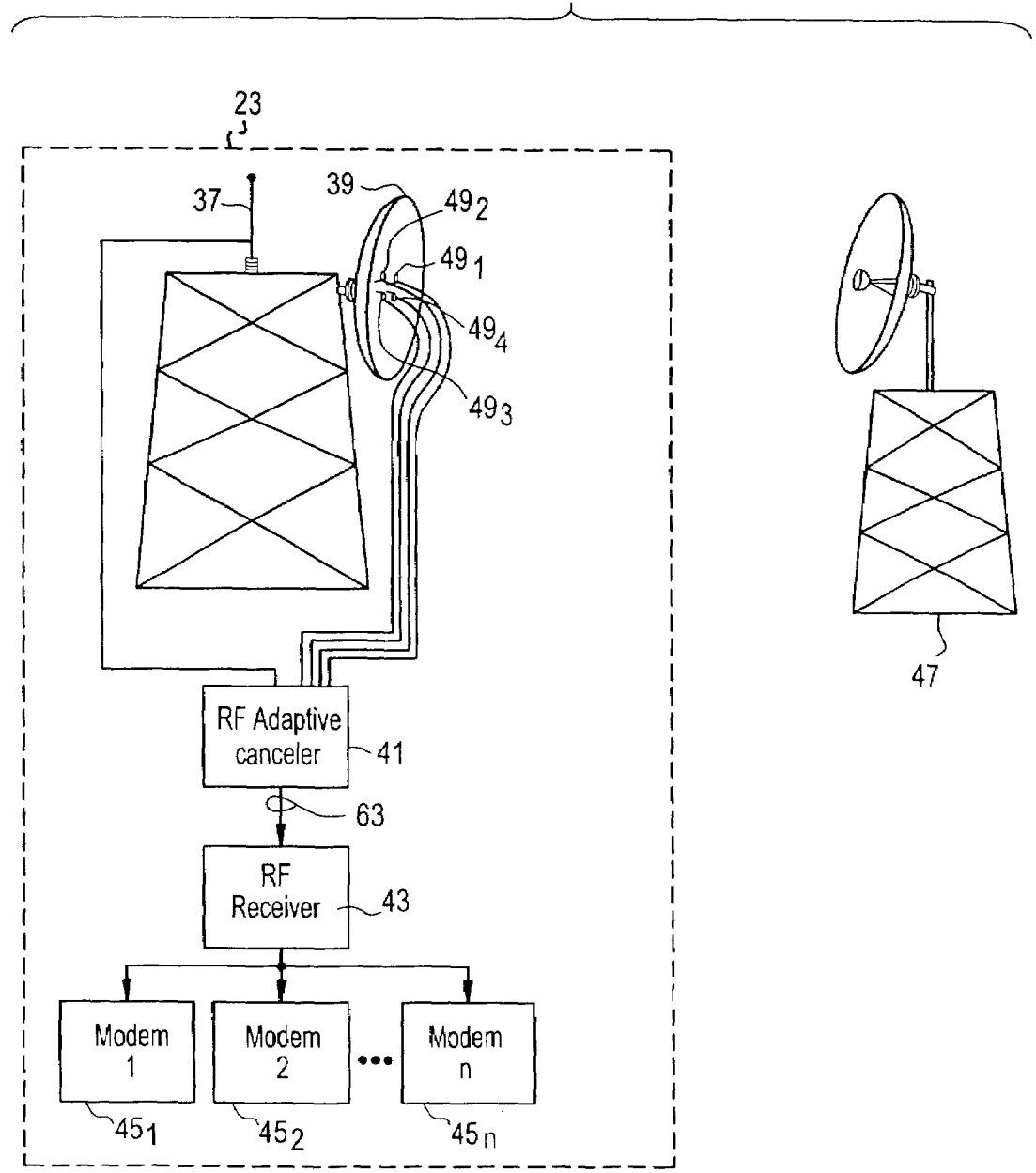
FIG. 3B is a diagram of the base station of the present invention with four coplanar feeds (n=4).

In order to cancel the effects of the known interferer 47, the auxiliary antenna 39 is directed toward the source of interference 47. The auxiliary antenna 39 architecture is highly focused and directional such that the only large signal received by the auxiliary antenna 39 is the signal from the interferer 47 and not the signals from the subscriber units 25. The auxiliary antenna 39 has a plurality of coplanar feeds $49_1$-$49_n$ for receiving a plurality of replicas of the signal transmitted by the interferer 47. One skilled in the art should clearly recognize that the number of individual feeds used is based upon the specification of a given application. A preferred embodiment having four coplanar feeds (n=4) is shown in FIG. 3B. Referring back to FIG. 3A, each interference replica has a different phase corresponding to the coplanar feed $49_1$-$49_n$ position in free space. After the interference replicas are received through the coplanar feeds $49_1$-$49_n$, the interference replicas are coupled to the RF adaptive canceler 41. The coplanar feeds $49_1$-$49_n$ located in the auxiliary antenna 39 are preferably spaced one-quarter to one-half wavelength of the carrier frequency apart.

Figure 4:
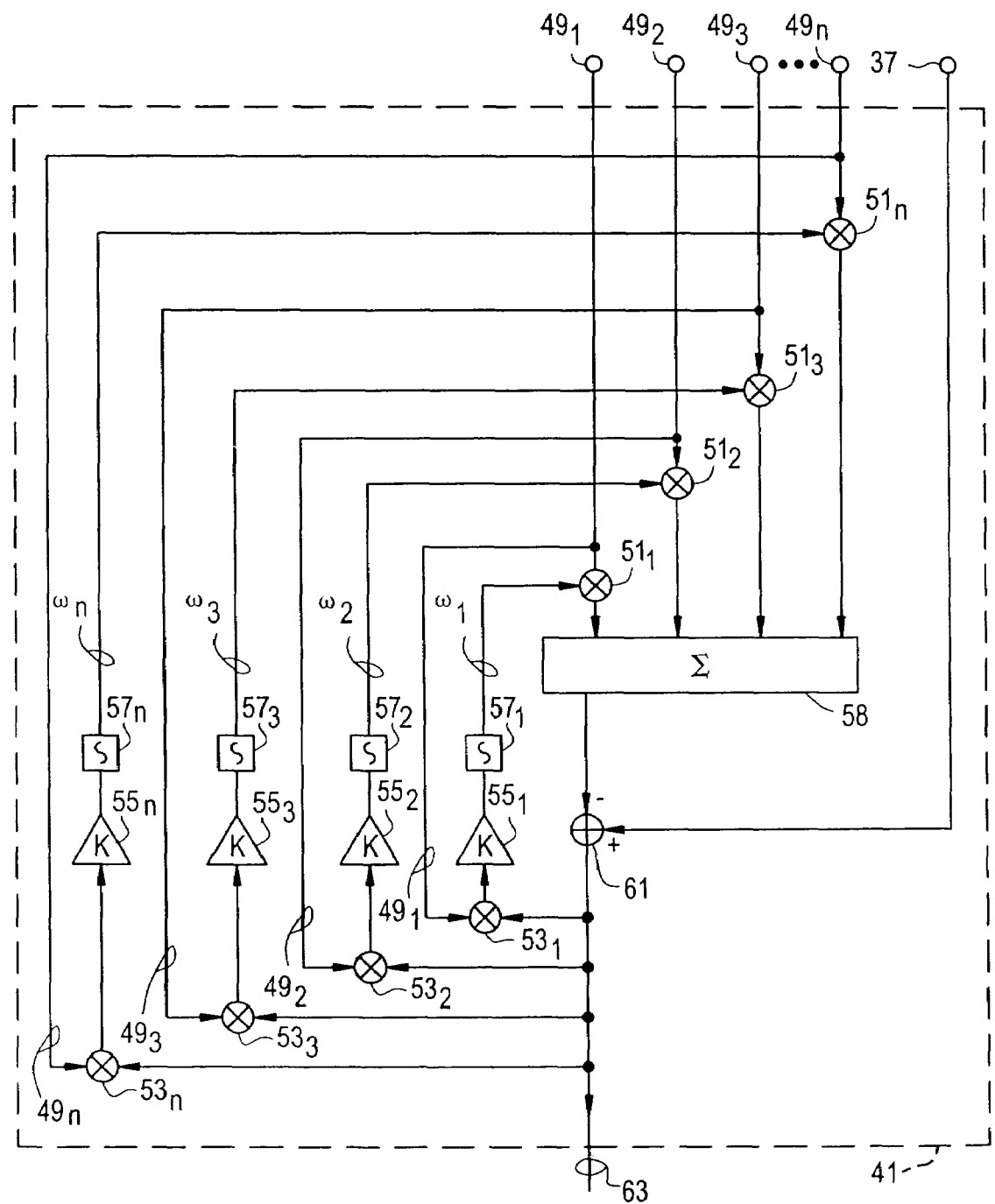
FIG. 4 is a diagram of a first embodiment of an RF adaptive canceler of the present invention.

Referring to FIG. 4, the RF adaptive canceler 41 removes the interference signals from the signal received by the main antenna 37 so that the overall background noise is greatly reduced. This is accomplished by providing the RF adaptive canceler 41 with circuitry for implementing a least mean square (LMS) algorithm or other adaptive algorithm to provide proper weights to each of the interference signals received by the coplanar feeds $49_1$-$49_n$. The proper weights for each interference replica are obtained when the adaptive canceler 41 reaches steady state. These weighted interference replicas are summed to provide a combined interference signal, which is subtracted from the signal from the main antenna 37 thereby deriving a signal substantially free from the interference source 47.

The RF adaptive canceler 41 includes weighting mixers $51_1$-$51_n$, integrating mixers $53_1$-$53_n$, operational amplifiers $55_1$-$55_n$, integrators $57_1$-$57_n$, a summation unit 58, and summer 61. Weighting mixers $51_1$-$51_n$ and integrating mixers $53_1$-$53_n$ receive the interference replicas from feeds $49_1$-$49_n$ respectively. Each corresponding weighting mixer $51_1$-$51_n$, operational amplifiers $55_1$-$55_n$, and integrators $57_1$-$57_n$, are operatively coupled to produce respective weights $W_1$-$W_n$ which are mixed with the respective interference replica via mixers $51_1$-$51_n$. The weights $W_1$-$W_n$ are initially zero so that the interference replicas initially received pass to the summation unit 58 without adjustment. The output of the summation unit 58 is a combined interference signal and is subtracted from the total signal received from the main antenna 37 using the summer 61.

The adaptive canceler 41 outputs the received signal absent the known interference 47 to both the RF receiver 43 and the mixers $53_1$-$53_n$ to create multiple feedback loops for implementing feed $49_1$-$49_n$ weight $W_1$-$W_n$ adjustments. The signals output from the integrating mixers $53_1$-$53_n$ are fed to amplifiers $55_1$-$55_n$ and integrators $57_1$-$57_n$ to adjust the weights $W_1$-$W_n$ which are input to weighting mixers $51_1$-$51_n$. The amplified and integrated signals are mixed with the interference replicas. This completes the LMS circuit. Once the signal input levels to the integrators $57_1$-$57_n$ are zero, the adaptive canceler 41 is in steady state and the weights $W_1$-$W_n$, remain constant until a perturbation in the interference is experienced.

The outputs of the integrators $57_1$-$57_n$ continuously provide appropriate weights $W_1$-$W_n$ via the feedback loops to the summation unit 59. The combined interference signal output from summation unit 59 is subtracted from the signal received from main antenna 37 by the summer 61, so that the signals received from the main antenna 37 are output 63 from the RF adaptive canceler 41 substantially free from the interference produced by the fixed interferer 47.

Figure 5:
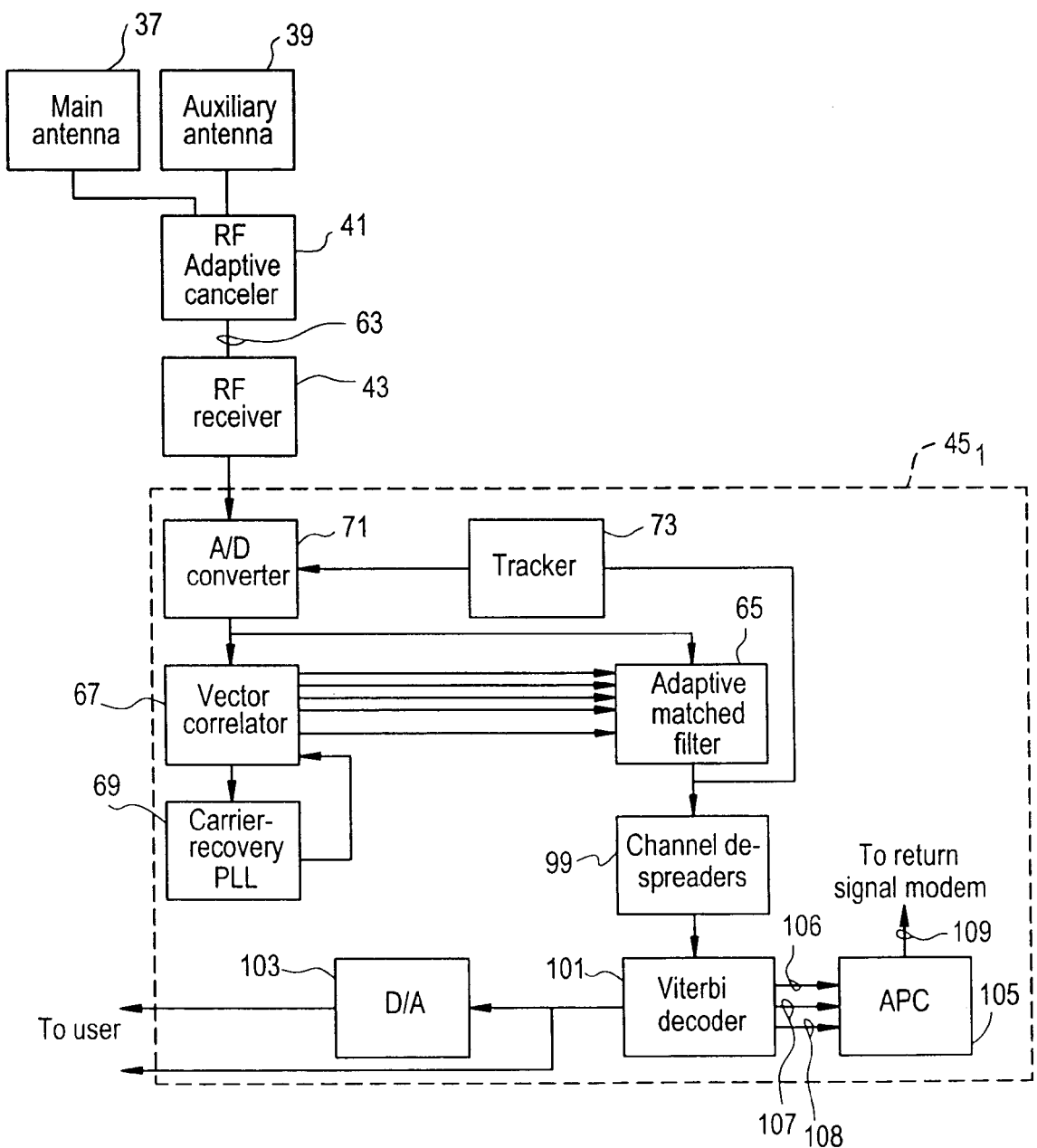
FIG. 5 is a detailed diagram of a base station of the present invention.

Referring back to FIG. 3A, the adaptive canceler 41 is coupled to the RF receiver 43 which demodulates the RF signal removing the carrier frequency and outputting a baseband signal to the modems $45_1$-$45_n$. The modems $45_1$-$45_n$ search through possible phases of the resulting baseband signal until they detect the correct phase. Phase-distorted copies of the communication signal or "multiples," are compensated for by overlaying them on the correct phase which results in increased gain. This function is performed by an adaptive matched filter (AMF) 65 which operates in conjunction with phase correcting coefficients determined by a vector correlator or rake receiver 67 with a carrier recovery phase-locked loop (PLL) 69 (FIG. 5).

More specifically, each of the modems $45_1$-$45_n$ includes an analog-to-digital (A/D) converter 71 which quantizes the baseband signal into a digital signal with the assistance of a tracker 73. The tracker 73 directs the A/D converter 71 to sample the strongest analog representation of the data being transmitted to the base station 23 to provide an accurate digital signal. The digital signal may include a plurality of data signals and a pilot signal.

As is well known in this art, CDMA communication units use a pilot signal to provide synchronization of a locally generated pseudorandom code with the pseudorandom code transmitted by the transmitting station, and to provide a transmission power reference during initial power ramp-up. Typically, a base station 23 transmits the pilot signal to the remote units 25 to provide synchronization of locally generated pseudorandom codes with the transmitted pseudorandom code. The pilot signal is a pseudorandom sequence of complex numbers having a magnitude (real component) of one and phase (imaginary component) of zero.

The digital pilot signal will suffer from the same distortion as the digital data signal, since they are both transmitted within the RF signal. Accordingly, the vector correlator 67, receives the pilot signal and determines in conjunction with a phase-locked loop (PLL) 69 filter coefficients based on the distortion of the pilot signal. The derived coefficients represent the distortion or errors of the data signal. The data signal/CDMA communication signal, which is directed to the AMF 65, is processed by the AMF 65 according to the filter coefficients generated by the vector correlator 67 in combination with the PLL 69.

As disclosed in U.S. patent application Ser. No. 08/266,769 and U.S. patent application Ser. No. 08/871,109, which are incorporated by reference as if fully set forth herein, vector correlators in conjunction with phase-locked loop circuitry have been utilized to produce filter coefficients to correct for multipath distortion. In the present invention, the vector correlator 67 and PLL 69 generate filter coefficients associated with multipath distortion.

Figure 6:
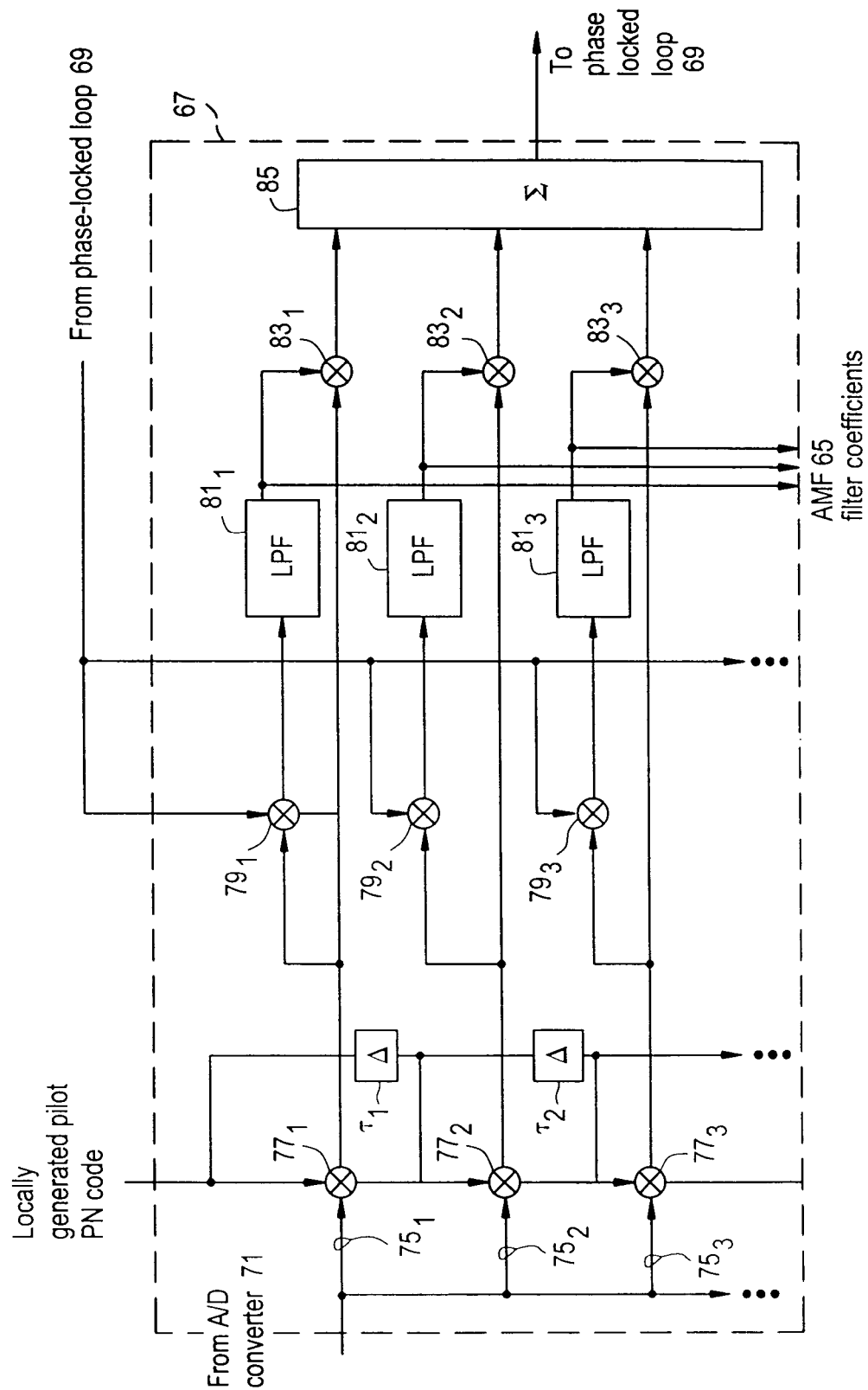
FIG. 6 is a diagram of a vector correlator.

Referring to FIG. 6, the vector correlator 67 provides an estimate of the complex channel impulse response, having real and imaginary components, of the bandwidth over which the CDMA communication signal is transmitted. The vector correlator 67 has a plurality of independent elements or "fingers" $75_1$-$75_n$, preferably eleven, wherein the pseudorandom pilot signal input to each finger $75_1$-$75_n$ is delayed $J_1$-$J_n$ by one chip to define a processing "window." A typical processing window would include eleven chips. The pilot signal is input to each element $75_1$-$75_n$.

Each element $75_1$-$75_n$ performs an open-loop estimation of the sampled impulse response of the RF channel. Thus, the vector correlator 67 produces noisy estimates of the sampled impulse response at evenly spaced intervals. Accordingly, the signal analysis performed by the vector correlator 67 determines phase distortions occurring at different points within the processing window, for example, distortion attributable to multipath interference.

In operation, each element $75_1$-$75_n$ of the vector correlator 67 receives a locally generated pseudorandom pilot signal. The signal supplied to the vector correlator 67 from the A/D converter 71 is input to each element. Mixers $77_1$-$77_n$ mix the locally generated pilot pseudorandom code with the received signal to despread the pilot signal. The delay units $J_1$-$J_n$ impart a one chip delay on the despread pilot signal. Each element $75_1$-$75_n$ receives a carrier offset phase correction signal from the PLL 69, which is mixed with the despread pilot signal in each element $75_1$-$75_n$ by mixers $79_1$-$79_n$ to provide sample impulse response estimates. The vector correlator 67 further includes a plurality of low-pass filters $81_1$-$81_n$ which are coupled to each mixer $79_1$-$79_n$ to smooth each corresponding sample impulse response estimate. The complex conjugates of each smoothed sampled impulse response estimate are used as the filter coefficients, or weights, for the AMF 65. In addition, the complex conjugate of each smoothed sampled response is mixed with the despread pilot signal by mixers $83_1$-$83_n$. The summation unit 85 receives the outputs of mixers $83_1$-$83_n$ and outputs the combined despread pilot signal which is substantially free from multipath distortion.

The carrier recovery PLL 69 processes the output of the vector correlator 67 to estimate and correct the phase error or difference due to RF carrier signal offset. The offset may be due to internal component mismatches and/or RF distortion. Component mismatches between the subscriber oscillator and the receiver oscillator may cause slightly different oscillator outputs. These component mismatches can be further exacerbated by local and environmental conditions, such as the heating and cooling of electronic components which may affect the temperature coefficient of the various components. With respect to RF channel distortion, Doppler effects caused by the motion of the receiving stations relative to the transmitter station or a mismatched reflector may cause the RF carrier to become distorted during transmission. This may result in a RF carrier offset. The PLL 69 architecture is preferably executed in a programmable digital signal processor (DSP).

Figure 7:
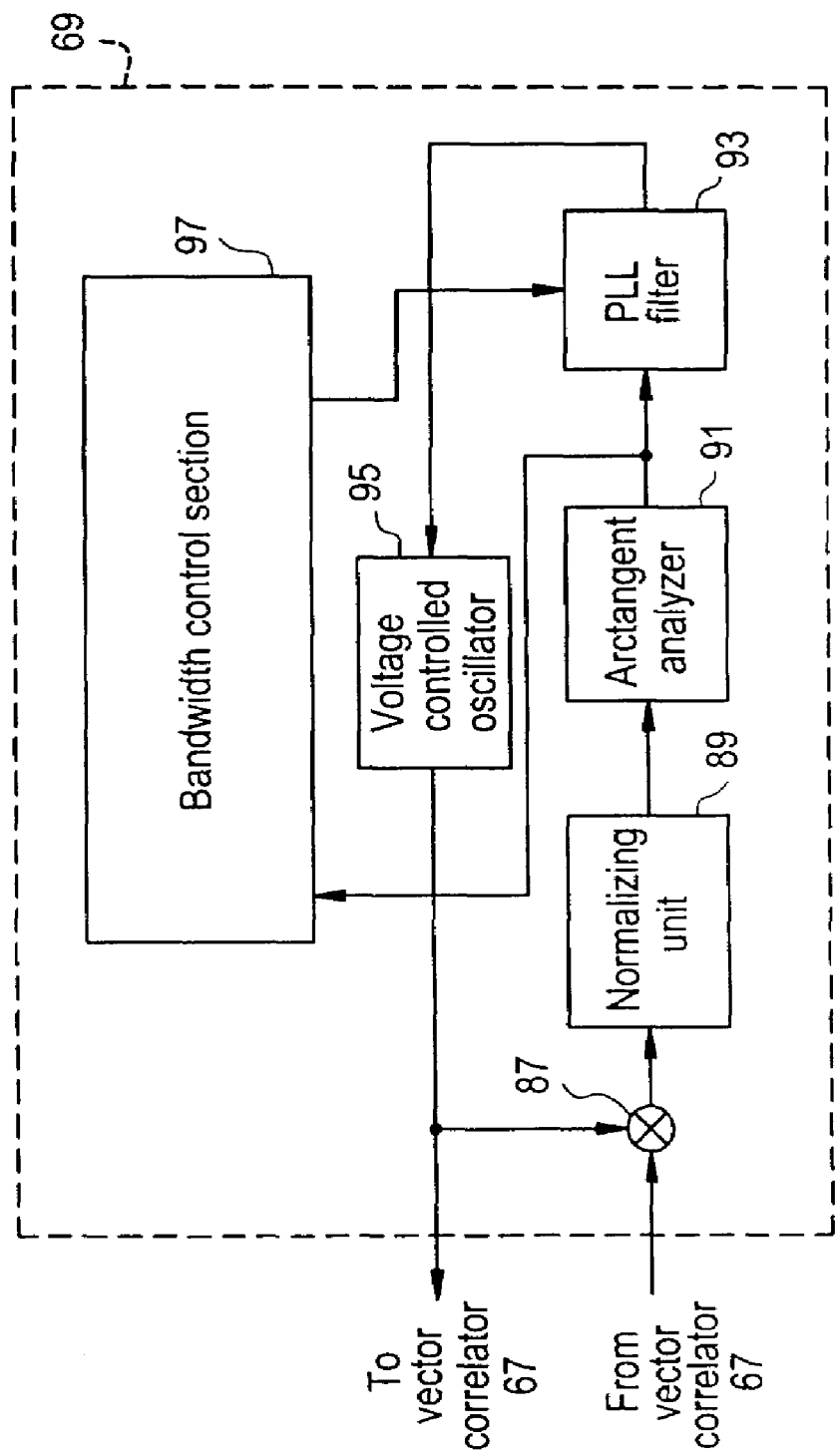
FIG. 7 is a diagram of a phase-locked loop (PLL).

Referring to FIG. 7, the continuously adjusted-bandwidth PLL 69 comprises a mixer 87, a normalizing unit 89, an arctangent analyzer 91, a phase-locked loop filter 93, a voltage controlled oscillator (VCO) 95 and a bandwidth control section 97. The mixer 87 receives the output from the vector correlator 67 which is the despread pilot signal processed to correct for channel distortion due to multipath effects. The despread pilot signal is mixed with a correction signal from the VCO 95 to produce a complex error signal which is coupled to the normalizing unit 89. The normalized signal is coupled to the arctangent analyzer 91. The arctangent analyzer 91 outputs a phase angle derived from the complex (number) error signal. The bandwidth control section 97 continuously monitors the quantized phase error signal and generates a control signal to control the bandwidth of the phase locked-loop filter 93. The signal output for the phase-locked loop filter 93 is transmitted to the VCO 95. The VCO 95 outputs a feedback signal to mixer 87. The output from phase-locked loop filter 93 indicates carrier-offset phase error. The process is repeated until a complex error signal output from the mixer 87 is at a minimum. Optimum performance of the modem $45_1$ will not occur until the vector correlator 67 and PLL 69 have reached a mutually satisfactory equilibrium point.

The vector correlator 67 outputs weighting coefficients to the AMF 65. The AMF 65 processes the communication signal to compensate for channel distortion due to multipath effects. This compensation increases the gain of the signal by, in effect, overlaying delayed replicas of the signal. The AMF 65 outputs the filtered signal to a plurality of channel despreaders 99. The despread channel signals are coupled to Viterbi decoders 101 for decoding the forward error correction (FEC) encoded data signals.

The channel despreaders 99 couple to the Viterbi decoders 101 which function as described in copending application Ser. No. 08/871,008, which is incorporated by reference as if fully set forth of the convolutional encoder (not shown) of a subscriber unit 25. The Viterbi decoders 101 decodes the FEC signal rendering the original data signal. The resulting data signal can be output either digitally or converted to analog with a digital to analog converter (DAC) 103. The Viterbi decoders 101 also perform a bit error rate (BER) 106 calculation which is coupled to an automatic power control (APC) unit 105.

The APC unit 105 determines whether the transmission signal strength of the received data signal should be increased or decreased to maintain an acceptable bit error rate based upon the estimate of the interference provided by the channel despreaders 99. The BER 106 output from the Viterbi decoder 101 is coupled to the APC unit 105 to adjust transmission power. The APC unit 105 calculates a signal-to-interference ratio ($SIR_t$) threshold for the system to maintain. An adjustable input representing a desired quality of service is input into the APC unit 105 as a combination of desired bit error ($BER_0$) 107 and signal to interference ratio ($SIR_0$) 108. The choice of quality depends whether the system is providing simple voice communication or a more sophisticated transmission such as facsimile. The quality determination is performed during decoding. The relationship $$SIR_t = SIR_0 + k(BER - BER_0)$$

determines $SIR_t$ 109 which is the sought interference threshold. A weight or gain k adjusts the deviation from the desired $BER_0$ and derives the $SIR_t$ from the base $SIR_0$ which is used to adjust transmission power. This instruction is conveyed within the reverse signal to a subscriber.

Figure 8A:
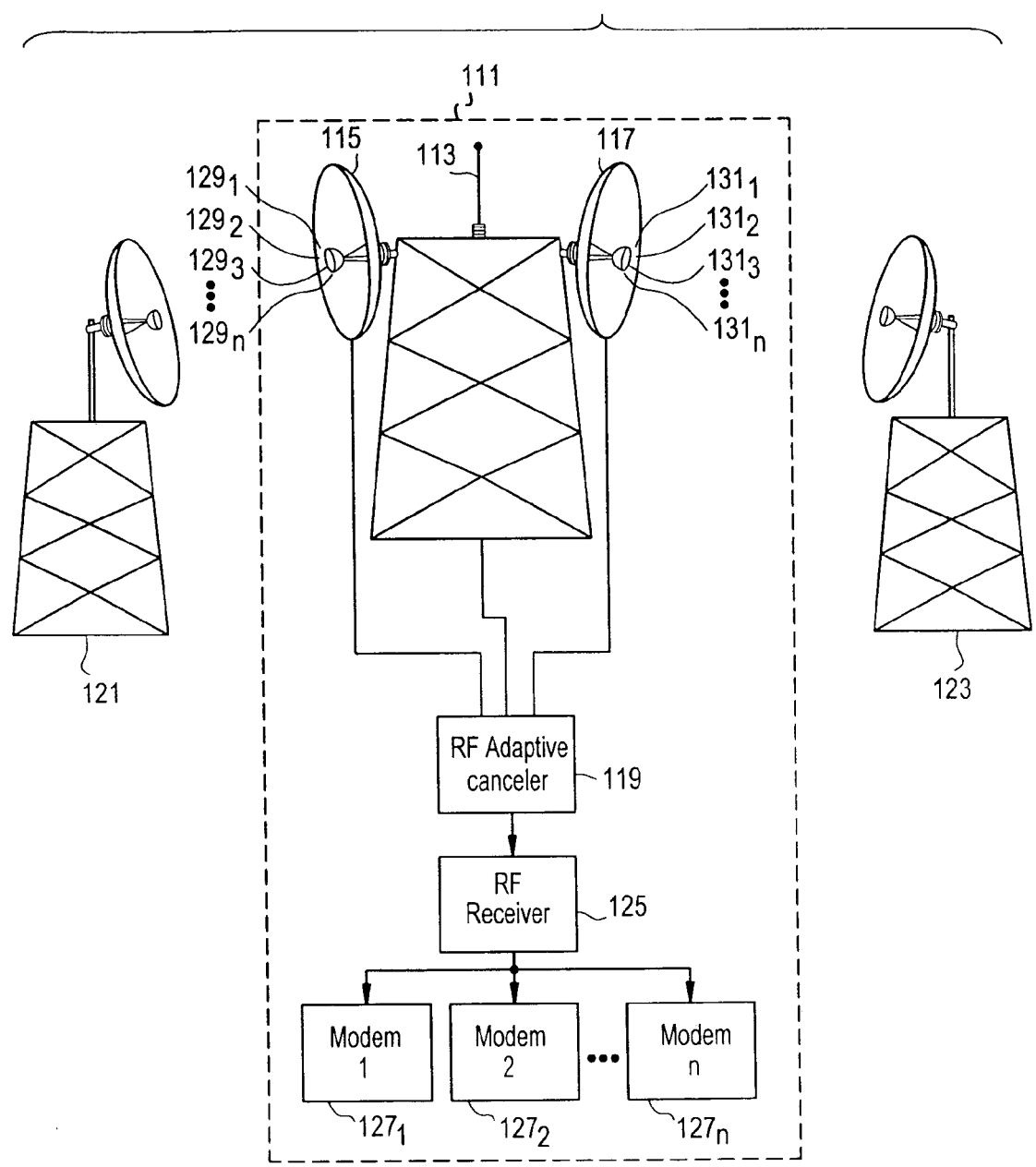
FIG. 8A is a diagram of a second embodiment of a base station of the present invention.

A base station 111 in accordance with a second embodiment of the present invention will be explained with reference to FIG. 8A. The base station 111 includes a main antenna 113 and first 115 and second 117 auxiliary antennas which are coupled to an RF adaptive canceler 119. The first 115 and second 117 auxiliary antennas are directed at separate known interferers 121, 123. The adaptive canceler 119 is coupled to an RF receiver 125, which is connected to a plurality of modems 127 as in the first embodiment. The RF adaptive canceler 119 cancels the effects of the two interferers. If additional known interferers are present in the operating region of main antenna 113, additional auxiliary antennas facing the additional interferers can be added to cancel the effects of the additional interferers.

Figure 8B:
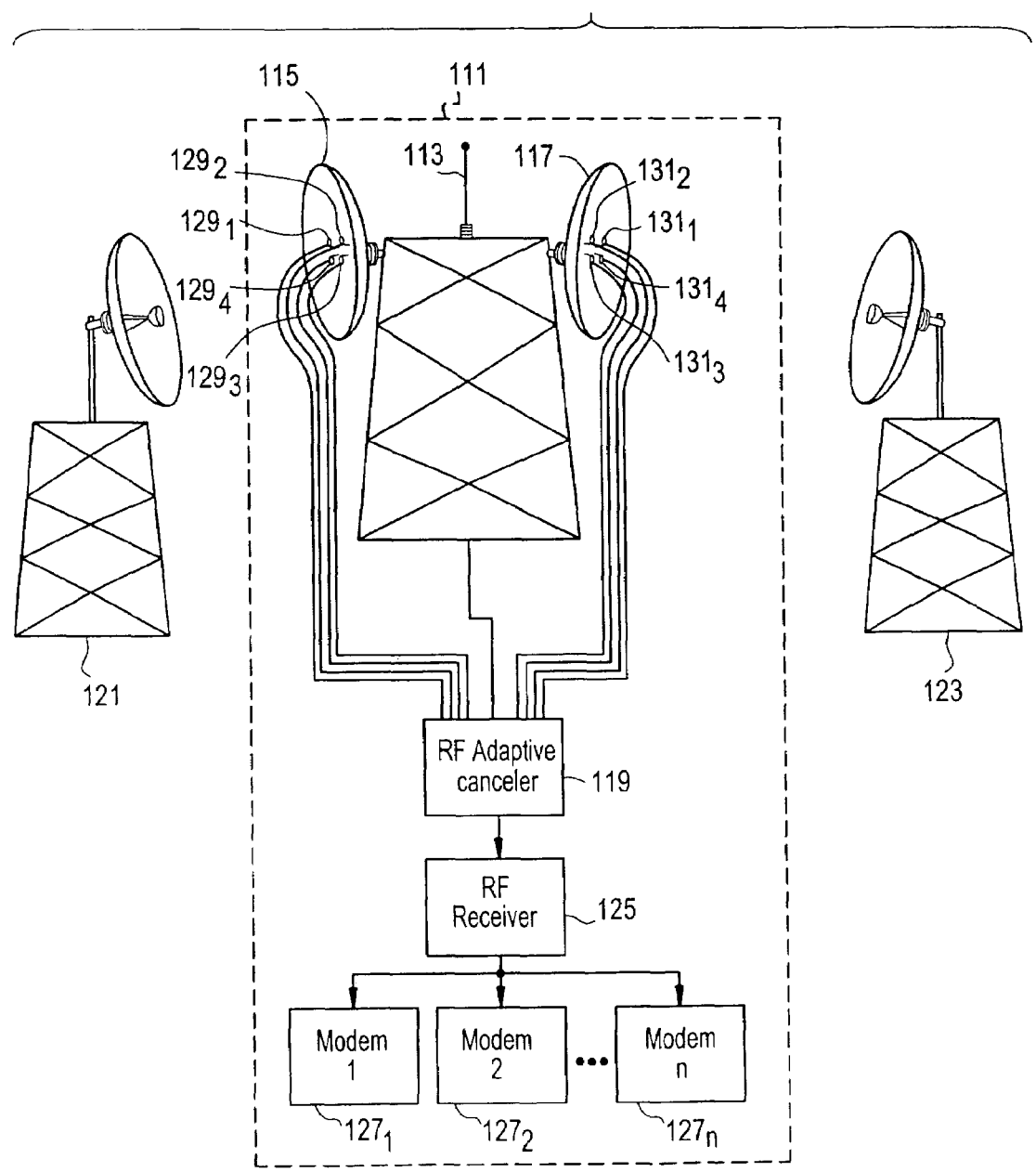
FIG. 8B is a diagram of the second embodiment of the base station with four coplanar feeds (n=4) for both first and second auxiliary antennas.

The first auxiliary antenna 115 has a plurality of coplanar feeds $129_1$-$129_n$ for receiving replicas of the interference signal from the interferer 121. An embodiment having four coplanar feeds (n=4) for both first and second auxiliary antennas is shown in FIG. 8B. Referring back to FIG. 8A, the coplanar feeds $129_1$-$129_n$ are preferably one quarter to one half wavelength apart. The second auxiliary antenna 117 also has a plurality of coplanar feeds $131_1$-$131_n$ for receiving the replicas of the interference signal from the second interferer 123. The coplanar feeds $131_1$-$131_n$ are preferably a one quarter to one half wavelength apart. In addition, both first 115 and second 117 auxiliary antennas are focused such that substantially only the signals from the first 121 and second 123 interferers will be received by the auxiliary antennas respectively, and the signals from a subscriber unit 25 will not be received by the auxiliary antennas. After all the interference replicas are received through the coplanar feeds $129_1$-$129_n$ and $131_1$-$131_n$, the replicas of the first 115 and second 117 auxiliary antennas are passed to the RF adaptive canceler 119. Each replica has a different phase corresponding to the position of each coplanar feed.

Figure 9:
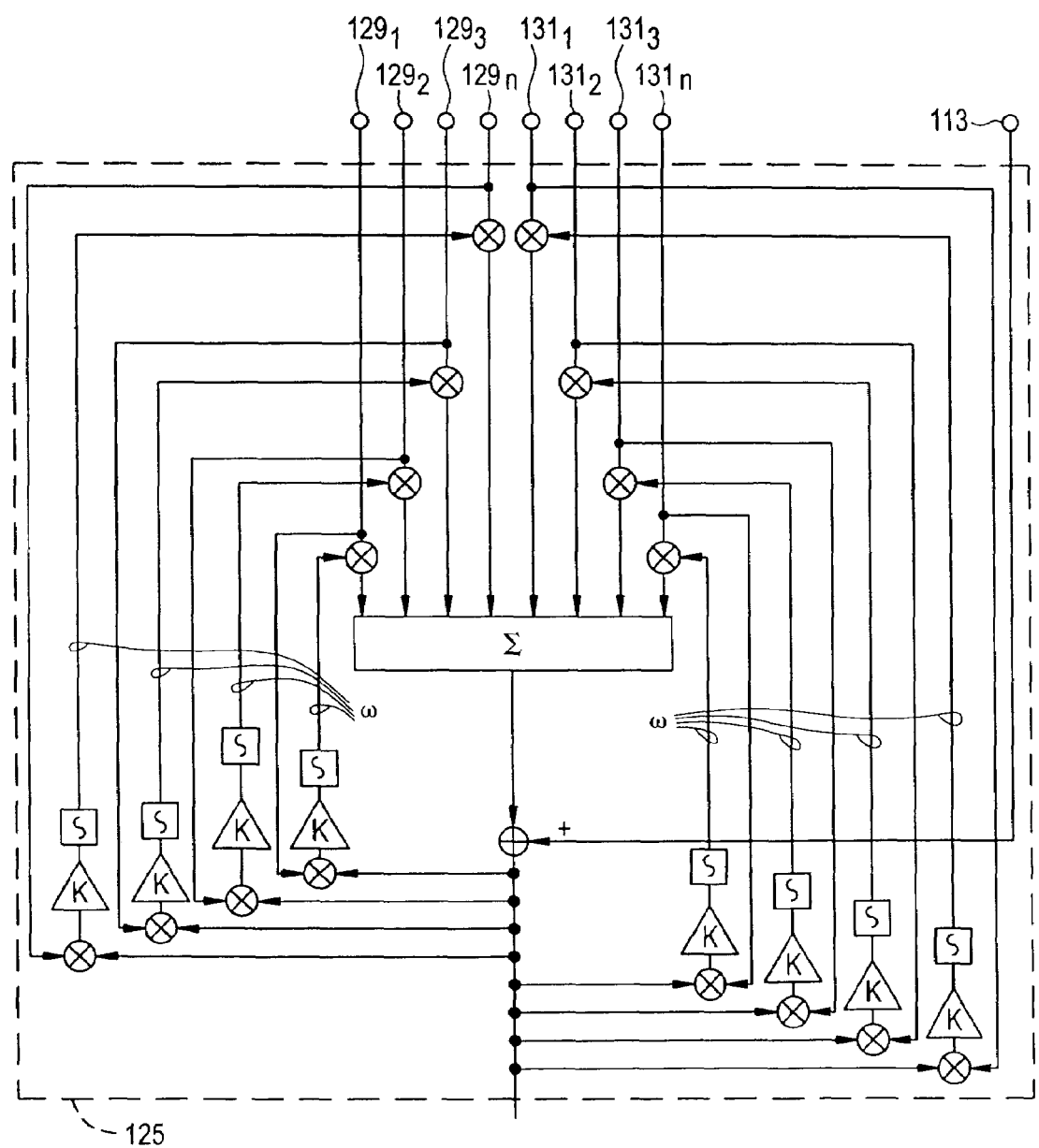
FIG. 9 is a diagram of a second embodiment of an RF adaptive canceler of the present invention.

Referring to FIG. 9, an examination reveals that this embodiment 111 is the same as the adaptive canceler 41 shown in FIG. 4 with the inputs from auxiliary antenna 30 now comprising interference samples from the first auxiliary antenna 115 feeds $129_1$-$129_n$ and second auxiliary antenna 117 feeds $131_1$-$131_n$. The adaptive canceler of the present invention can input a plurality of directional interference sources comprised of a plurality of multiphase samples and perform a uniform LMS algorithm to remove the interference samples.

Figure 10:
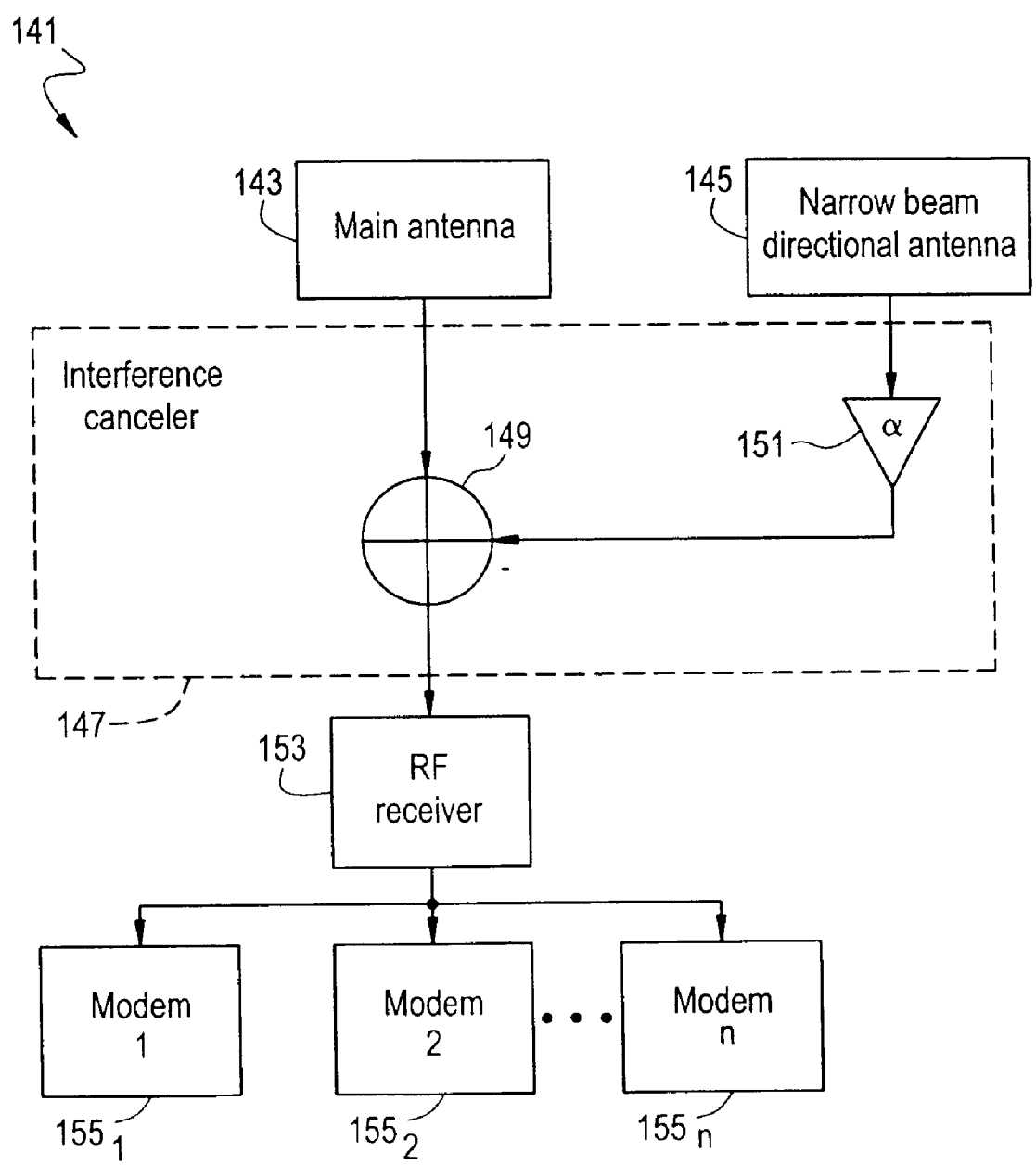
FIG. 10 is a diagram of a third embodiment of a base station of the present invention.

Referring to FIG. 10, a third alternative embodiment of a base station 141 made in accordance with the present invention is shown. The base station 141 includes a main antenna 143 and a narrow beam directional antenna 145 (auxiliary antenna) coupled to an interference canceler 147. The interference canceler 147 includes a summer 149 and an amplifier 151. The interference cancellation method involves directing the narrow beam directional antenna 145 towards a fixed interferer (not shown) as in the previous embodiments, weighting the signal received by the narrow beam directional antenna 145 by a factor " and subtracting it from the signal received from the main antenna 143 using a summer 149. The resulting signal is used for demodulating the transmitted data. The choice of the weighting factor " determines how much reduction in the fixed interference is obtained.

The total power received by the main antenna 110 in the absence of any interference cancellation scheme is:

$$P_0 = KP + P_i$$

where K equals the total number of users, P equals the power received at the base station from a user who is not in the narrow beam of the secondary antenna, and $P_i$ is the power received from a fixed interferer.

With both the main 143 and narrow beam 145 antennas, the total power received by the main antenna 110 is $$P_p = (K-M)P + MP^* + P_i$$

where M equals the number of users within the narrow beam of the narrow beam antenna 145, and P* is the power received from a user who is in the narrow beam of a narrow beam antenna 145. The total power received by the narrow beam antenna 145 is $$P_s = MP^* + P_{\{i\}}.$$

The signal that is to be used in demodulation has the total power, which is $$P_t = P_p - \forall P_s = (K-M) P + MP^{*} + P_i - \forall MP^{*} - \forall P_i.$$

or equivalently $$P_t = (K-M)P + M(1-\forall)P^* + (1-\forall)P_i$$

As a result of the automatic power control, all users' have the same signal strength contributing to the $$P = (1-\forall)P^* \text{ SUP total power } P_t. \text{ This implies }^*,$$

$$P^* = \frac{P}{1-\forall} \quad \text{Eqn. 7}$$

Therefore, $P_t$ can now be written as $$P_t = KP + (1-\forall)P_i$$

By comparing equation 9 to equation 3, the contribution of the fixed interferer when comparing signals received by the main antenna only to that received by the combined main-antenna auxiliary-antenna system has decreased by a factor of $(1-")$. For example, if $"=0.9$, the interference has been reduced by 10 dB. Thus, there is an effective spatial attenuation in the direction of the narrow beam antenna. This attenuation will affect not only the interferer, but users that are in the narrow beam path as well. To compensate, users within the path of the narrow beam directional antenna 145 must have antenna gains that are higher by a factor of $1/(1-")$. This can be achieved by giving these particular users higher gain antennas. This is practical because there will be only a few users within the narrow beam of the narrow beam directional antenna 145.

The weighted interference signal from amplifier 151 is subtracted from the signals received by way of main antenna 143 by summer 149 so that the signals from main antenna 143 are passed from the interference canceler 147 substantially free from the known interferers to a RF receiver 153 which demodulates and removes the carrier frequency. The baseband signal output by the RF receiver 153 is processed by the modems 155$_1$-155$_n$ as discussed in the first embodiments.

Figure 11:
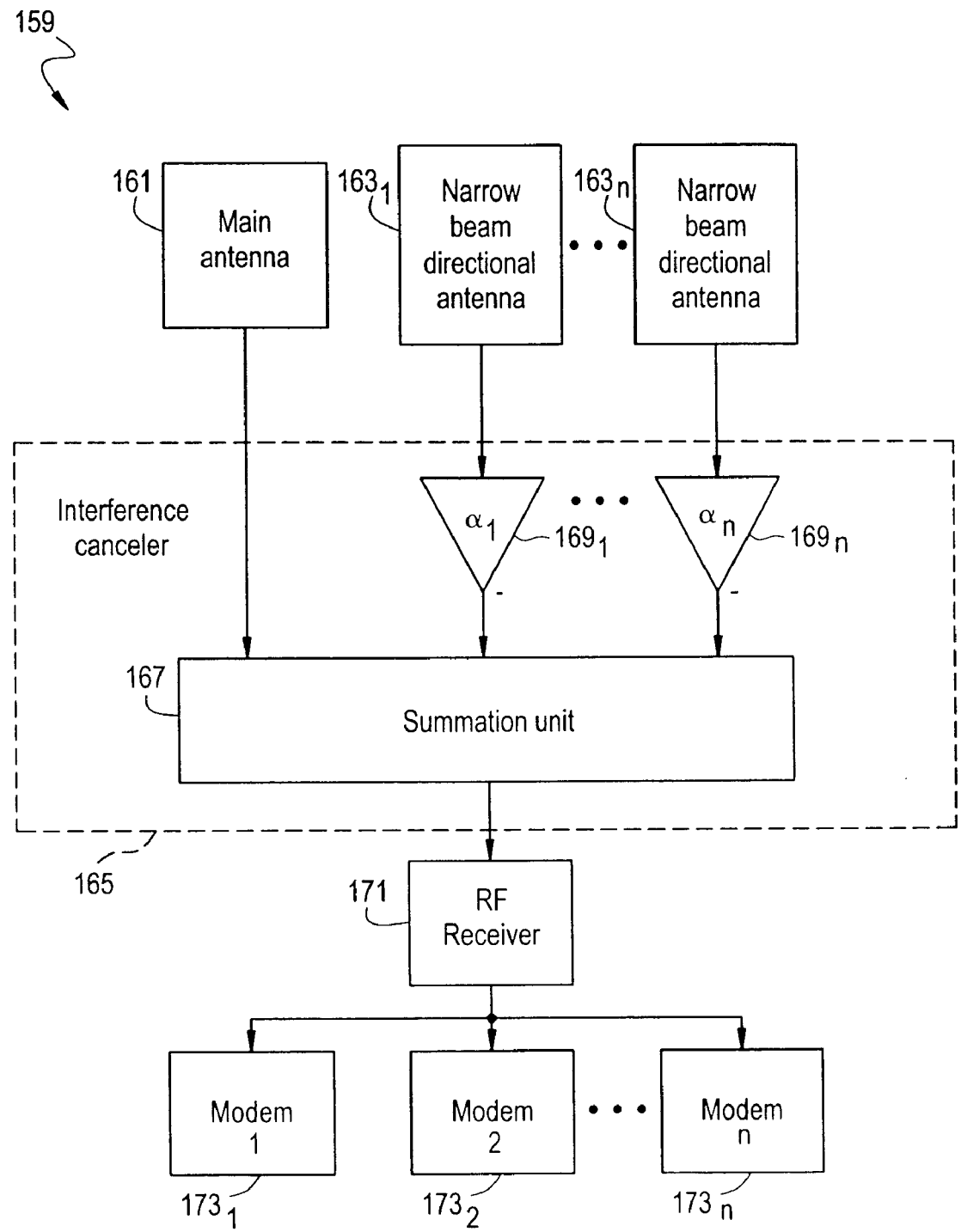
FIG. 11 is a diagram of a fourth embodiment of a base station of the present invention.

Referring to FIG. 11, a fourth alternative embodiment of a base station 159 is shown. The base station 159 includes a main antenna 161 and a plurality of narrow beam directional antennas 163$_1$-163$_n$ (auxiliary antennas) coupled to an interference canceler 165. The interference canceler 165 includes a summation unit 167 and a plurality of weighting amplifiers 169$_1$-169$_n$ coupled to each narrow beam directional antenna 163$_1$-163$_n$. The interference cancellation method involves directing each narrow beam directional antenna 163$_1$-163$_n$ toward a corresponding fixed interferer as in the second alternative embodiment, weighting the signals received by the narrow beam directional antennas 163$_1$-163$_n$ by corresponding weighting factors $"_1$-$"_n$ and subtracting the weighted signals from the signal received by way of the main antenna 161 using summation unit 167. The resulting signal is then used for demodulation of user data. The choice of the weighting factors $"_1$-$"_n$ determines the reduction in the fixed interference as explained in the third embodiment.

The weighted interference signals from the amplifiers 169$_1$-169$_n$ are subtracted from the signals received by the main antenna 161 by summation unit 167 so that the signals from main antenna 161 are passed from the interference canceler 165 substantially free from the known interferers to a RF receiver 171 which demodulates and removes the carrier frequency. The baseband signal output by the RF receiver 171 is processed by the modems 173$_1$-173$_n$ as discussed in the first embodiment.

Figure 12:
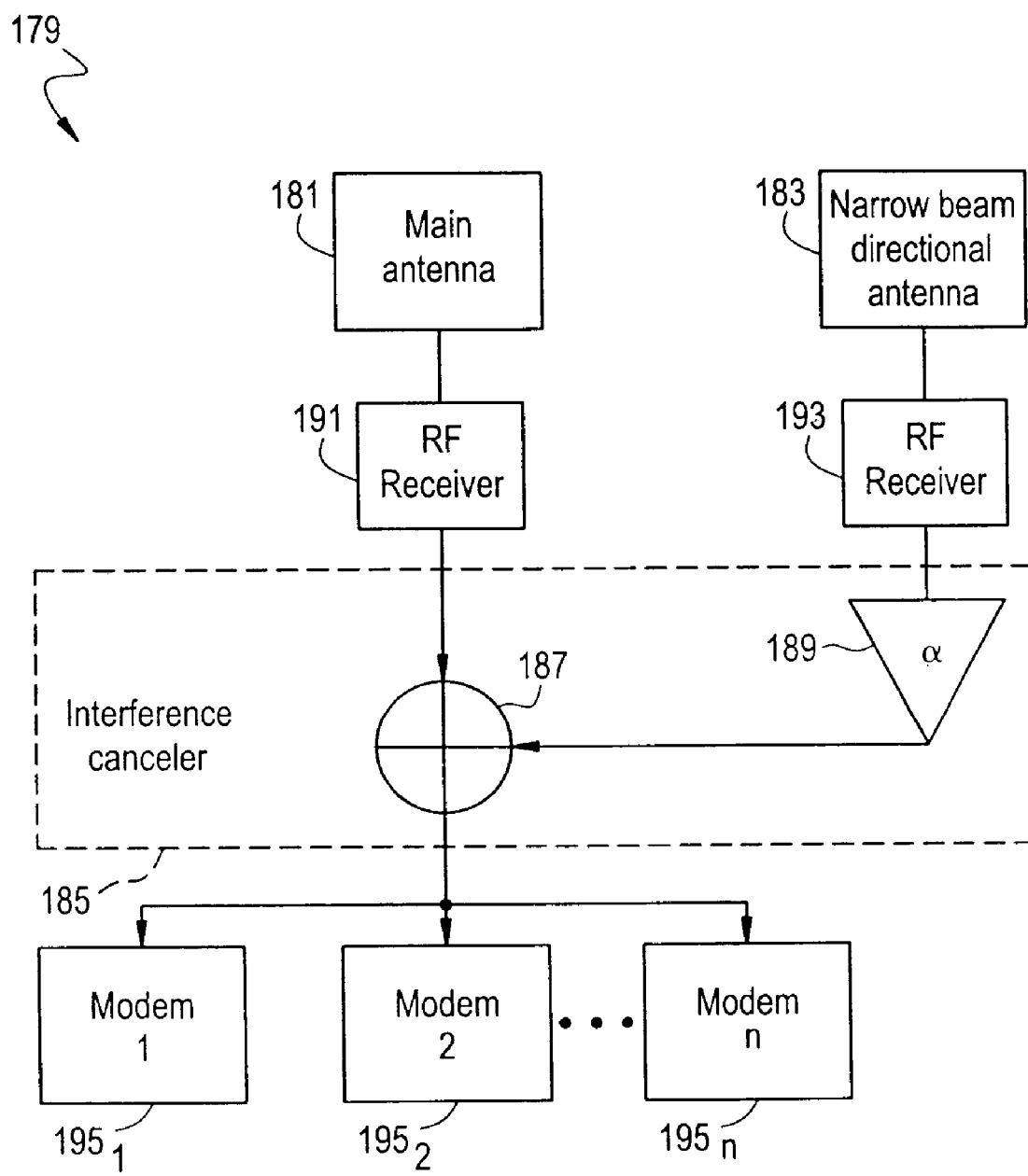
FIG. 12 is a diagram of a fifth embodiment of a base station of the present invention.
Figure 13:
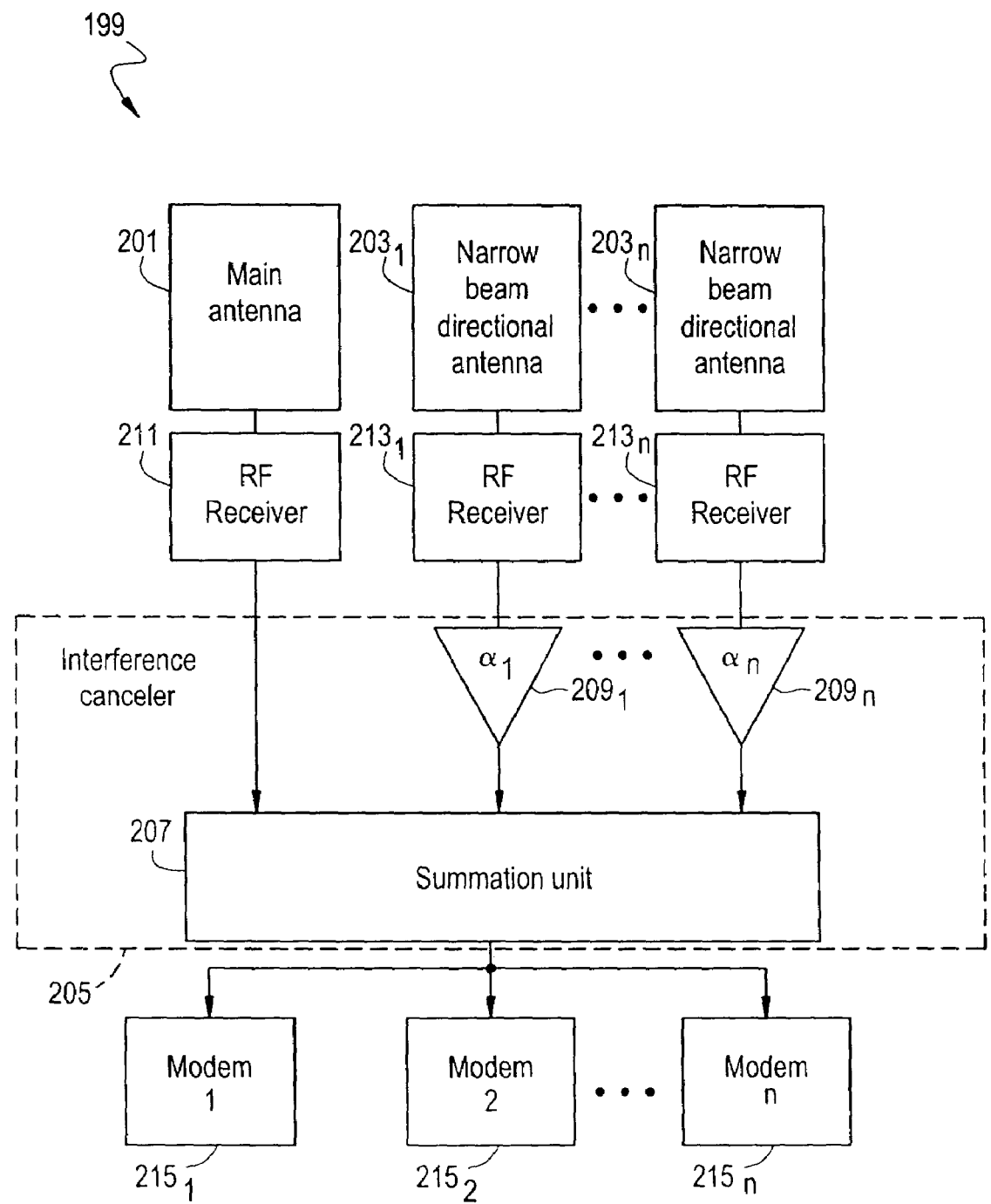
FIG. 13 is a diagram of a sixth embodiment of a base station of the present invention.

Referring to FIGS. 12 and 13, fifth 179 and sixth 199 alternative embodiments are shown similar to the architectures in FIGS. 10 and 11 differing in that the RF receivers are coupled directly to the antennas, demodulating the RF signals to baseband first and then performing the subtraction of the interferers received from the narrow beam directional antennas. As one skilled in this art would recognize, the processing of the received signal and individually received interferers is at a frequency bandwidth much less than the transmission frequency bandwidth. Both the interference cancelers employed in the fifth 179 and sixth 199 alternative embodiments functions identically to those described in the third and fourth embodiments shown in FIGS. 10 and 11.

The alternative embodiments shown in FIGS. 10-13 require synchronization of the received signals before subtraction can be made. This means that the cable lengths and other passive delays in the receive path of the main antenna and the auxiliary antenna(s) must be matched. The main antenna and auxiliary antenna(s) must be placed relatively close to each other to make sure that the receive signal from the antennas are not subject to different channel responses.

Although the invention has been described in part by making detailed reference to certain specific embodiments, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A base station for use in canceling interference from at least one known interference source, the base station comprising:
   a main antenna for receiving signals from a plurality of remote users;
   at least one directional antenna, directed independent of said main antenna, toward said at least one interference source, said directional antenna having a plurality of coplanar feeds that are located one quarter to one half wavelength apart from each other, each coplanar feed for receiving an RF signal;
   a weighting unit for weighting said RF signals received by said plurality of coplanar feeds to produce a cancellation signal;
   a first summer for summing said weighted signals using a least mean square (LMS) algorithm; and
   a second summer for summing said cancellation signal with signals received from said main antenna to produce an output signal substantially free from interference.

2. The base station of claim 1 wherein said weighting is performed using a predetermined factor $\alpha$.

3. The base station of claim 2 wherein the directional antenna path is directed such that each of the plurality of remote users is located within the narrow beam path of the directional antenna, and wherein the antenna gain of each user remote communicating with said base station is greater than $1/(1-\alpha)$ relative to the main antenna.

4. The base station of claim 1, further comprising:
   an RF receiver for demodulating the output signal to produce a baseband signal; and
   a plurality of modems coupled to the RF receiver for providing phase correction of said baseband signal.

5. The base station of claim 4, wherein each of the plurality modems comprises:
   a converter configured to produce a digital signal by quantizing the baseband signal, said digital signal comprising a data signal and a pilot signal;
   a processor configured to derive filter coefficients based on phase error due to RF carrier offset of the data signal;
   a decoder for compensating for channel distortion due to multipath effects;
   a processor for determining bit error rate; and a control unit capable of automatic power control responsive to the bit error rate.

6. The base station of claim 4, wherein each of the plurality of modems comprises:
- an A/D converter operatively coupled to a tracker;
- a vector correlator operatively coupled to an output of the A/D converter;
- a carrier recovery phase-locked loop unit operatively coupled to the vector correlator for producing filter coefficients in conjunction with the vector correlator;
- an adaptive matched filter (AMF) with an input operatively coupled to the A/D converter and the vector correlator and an output coupled to the tracker;
- a plurality of channel despreaders coupled to the AMF output;
- a Viterbi decoder operatively coupled to the output of said plurality of channel despreaders; and
- an automatic power control (APC) unit operatively coupled to the Viterbi decoder.

7. A method for interference cancellation for use in conjunction with a base station having a main antenna for receiving signals from a plurality of remote users and at least one independently steerable directional antenna, wherein at least one interference source is known, comprising the steps of:
- directing at least one directional antenna, independent of said main antenna, towards said at least one interference source, which may be different than the direction to which said main antenna is directed, each directional antenna having a plurality of coplanar feeds that are located one quarter to one half wavelength apart from each other, each coplanar feed for receiving an RF signal; and
- cancelling an interference signal generated by said at least one known interference source.

8. The method of claim 7, wherein said cancelling step comprises:
- weighting said RF signals received by said plurality of coplanar feeds to produce a cancellation signal;
- summing said weighted signals using a least mean square (LMS) algorithm; and
- summing said cancellation signal with signals received from said main antenna to produce an output signal substantially free from interference.

9. The method of claim 8, wherein said weighting is performed using a predetermined factor $\alpha$.

10. The method of claim 9, wherein the directional antenna path is directed such that each of the plurality of remote users is located within the narrow beam path of the directional antenna, and wherein the antenna gain of each user remote communicating with said base station is greater than $1/(1-\alpha)$ relative to the main antenna.

11. The method of claim 7, further comprising:
- demodulating the output signal to produce a baseband signal; and
- providing phase correction of said baseband signal.

* * * * *

UNITED STATES PATENT AND TRADEMARK OFFICE
CERTIFICATE OF CORRECTION

PATENT NO. : 7,519,395 B2  
APPLICATION NO. : 11/204883  
DATED : April 14, 2009  
INVENTOR(S) : Mesecher et al.

Page 1 of 1

It is certified that error appears in the above-identified patent and that said Letters Patent is hereby corrected as shown below:

On the Title Page Item (57), ABSTRACT, line 2, after the word "sources" insert --and--.

At column 7, line 14, before the words "to the" delete "couple" and insert therefor --are coupled--.

At column 7, line 18, before the words "the FEC" delete "decodes" and insert therefor --decode--.

At column 7, line 36, before the word "whether" insert --upon--.

At column 10, line 8, before the word "identically" delete "functions" and insert therefor --function--.

Signed and Sealed this

Thirtieth Day of June, 2009

JOHN DOLL  
*Acting Director of the United States Patent and Trademark Office*